US012670308B2

(12) United States Patent
Romain et al.

(10) Patent No.: US 12,670,308 B2
(45) Date of Patent: Jun. 30, 2026

(54) WORKLOAD AWARE EXERCISER DEVICE PLACEMENT

(71) Applicant: International Business Machines Corporation, Armonk, NY (US)

(72) Inventors: Michael Romain, Beacon, NY (US); Lucas Dane LaLima, Poughkeepsie, NY (US); Michael Greene, Austin, TX (US); Alper Buyuktosunoglu, White Plains, NY (US); Christopher Joseph Berry, Red Hook, NY (US); Pawel Owczarczyk, Highland, NY (US); Mark Cichanowski, Hutto, TX (US); William V. Huott, Holmes, NY (US); Ofer Geva, Poughkeepsie, NY (US); Jesse Peter Surprise, Highland, NY (US); Eduard Herkel, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 17/930,506

(22) Filed: Sep. 8, 2022

(65) Prior Publication Data

US 2024/0086608 A1     Mar. 14, 2024

(51) Int. Cl.
G06F 30/39          (2020.01)
G06F 30/392         (2020.01)
(Continued)

(52) U.S. Cl.
CPC .......... G06F 30/392 (2020.01); G06F 30/398 (2020.01); *G06F 2111/04* (2020.01); *G06F 2119/06* (2020.01)

(58) Field of Classification Search
USPC ........ 716/110, 101, 106, 104, 111, 119, 122, 716/127
See application file for complete search history.

(56) References Cited

U.S. PATENT DOCUMENTS

| | | | |
|---|---|---|---|
| 6,523,154 | B2 | 2/2003 | Cohn et al. |
| 7,797,654 | B2 | 9/2010 | Tai et al. |
| | | (Continued) | |

FOREIGN PATENT DOCUMENTS

JP          2004104039 A  *  4/2004

OTHER PUBLICATIONS

Wang "High Performance Distributed On-Chip Voltage Regulation for Modern Integrated Systems", Department of Electrical Engineering College of Engineering University of South Florida, Oct. 29, 2018 (Year: 2018).*

(Continued)

*Primary Examiner* — Brian Ngo
(74) *Attorney, Agent, or Firm* — Cantor Colburn LLP; Teddi Maranzano

(57)          ABSTRACT

Embodiments include exerciser device placement in the development of an integrated circuit. Aspects of the invention include obtaining a design of an integrated circuit and creating a dynamic power blockage map for the integrated circuit. Aspects also include updating the integrated circuit design by placing one or more exercisers on the integrated circuit, wherein a location of the one or more exercisers on the integrated circuit is based on at least in part on the dynamic power blockage map. Based on a determination that the updated integrated circuit design complies with one or more design constraints, aspects further include outputting the updated integrated circuit design.

18 Claims, 11 Drawing Sheets

(51) Int. Cl.
  *G06F 30/398* (2020.01)
  *G06F 111/04* (2020.01)
  *G06F 119/06* (2020.01)

(56) References Cited

U.S. PATENT DOCUMENTS

| | | | |
|---|---|---|---|
| 8,683,418 | B2 | 3/2014 | Bose et al. |
| 8,826,203 | B2 | 9/2014 | Darringer et al. |
| 10,242,145 | B1 | 3/2019 | Anand et al. |
| 10,515,182 | B2 | 12/2019 | Lo et al. |
| 10,890,349 | B2 | 1/2021 | Lee et al. |
| 11,333,707 | B2 | 5/2022 | Agarwal et al. |
| 2008/0098340 | A1 | 4/2008 | Oh |
| 2016/0210392 | A1 | 7/2016 | Wang et al. |
| 2017/0047259 | A1 | 2/2017 | Liu et al. |
| 2017/0116367 | A1 | 4/2017 | Bickford et al. |
| 2017/0308639 | A1 | 10/2017 | Chen |
| 2021/0247839 | A1* | 8/2021 | Pathak .................. G06N 3/006 |

OTHER PUBLICATIONS

Khatamifard et al., "ThermoGater: Thermally-Aware On-Chip Voltage Regulation", Jun. 26, 2017, 51 pages, https://people.ece.umn.edu/~ukarpuzc/Karpuzcu_files/thermoGaterTalk.pdf.

Wang Longfei, "High Performance Distributed On-Chip Voltage Regulation for Modern Integrated Systems", Nov. 2018, 105 pages, https://digitalcommons.usf.edu/cgi/viewcontent.cgi?article=8787&context=etd.

Xiang Yun, "On-chip Thermal Sensor Placement", Sep. 2008, 68 pages, https://scholarworks.umass.edu/server/api/core/bitstreams/b3d1fbe0-9eca-42a8-836a-6b7b36f95784/content.

* cited by examiner

350

352 — Apply power density based blockages for one or more workloads to the design of the IC 354 — Apply available resource based blockages to the IC 356 — Apply custom blockages to the IC

1500

1400

WORKLOAD AWARE EXERCISER DEVICE PLACEMENT

BACKGROUND

The present invention generally relates to integrated circuit development, and more specifically, to integrated circuit development using workload aware exerciser device placement.

The development of an integrated circuit (i.e., chip) involves several stages from design through fabrication. The chip may be subdivided into hierarchical levels to simplify design and testing tasks at different stages. Generally, a cell or macro may be regarded as a sub-section of the chip. For example, each macro may comprise several cells. Once the design is finalized, tests may be completed to ensure that design rules are met before fabrication. One such ensures that a maximum voltage (Vmax) is not exceeded on a chip, as operating above Vmax can lead to early end of life failures for the chip. Another test ensures that electric currents are within electromigration (EM) limits as prescribed by design geometries and use conditions. As a result, recent design efforts have been made to increase chip yields by reducing Vmax overshoots.

A recently developed method used to reduce Vmax overshoots is the addition of on-chip current exercisers that are configured to selectively activate and lower the voltage on the chip in the area of the exerciser by drawing current. Since these exercisers can draw large amounts of current placement of the exercisers can have large impacts on the operation and lifespan of the chip.

SUMMARY

Embodiments of the present invention are directed to exerciser device placement in the development of an integrated circuit. A non-limiting example computer-implemented method includes obtaining a design of an integrated circuit and creating a dynamic power blockage map for the integrated circuit. The method also includes updating the integrated circuit design by placing one or more exercisers on the integrated circuit, wherein a location of the one or more exercisers on the integrated circuit is based on at least in part on the dynamic power blockage map. Based on a determination that the updated integrated circuit design complies with one or more design constraints, the method further includes outputting the updated integrated circuit design.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, integrated circuit development may involve several stages that include the schematic design, floorplan layout, and fabrication. As also noted, on-chip current exercisers have recently been used to induce some additional power draw on a chip to ensure compliance with a voltage maximum (Vmax) constraint for the chip.

In general, there are certain physical and electrical constraints that must be satisfied when considering the placement and operation of such on-chip current exercisers, also referred to generally herein as exercisers. Improper placement of an exerciser a can result in regions of the chip exhibiting power/current draws or thermal deltas that push the design past its tolerances. Essentially, due to the power-inducing nature of exercisers, placement constraints and resource constraints associated with mitigating power-induced fallout must be adhered to. As such, the placement of these exerciser needs to account for the effective power draw of the surrounding circuitry, as well as the metal resources available through which the induced power must be channeled.

Embodiments of the present invention overcome the shortcomings of the current methods by performing exerciser device placement by creating a dynamic power blockage map that identifies potential exerciser placement locations based at least in part on the power draw of the surrounding circuitry and the metal resources available. In exemplary embodiments, based on a determination that the design resources are unavailable to safely operate these exerciser mechanisms to their fullest potential (i.e., at their highest power state), a new dynamic power blockage map can be created based on a lower power state of the exerciser.

Figure 1:
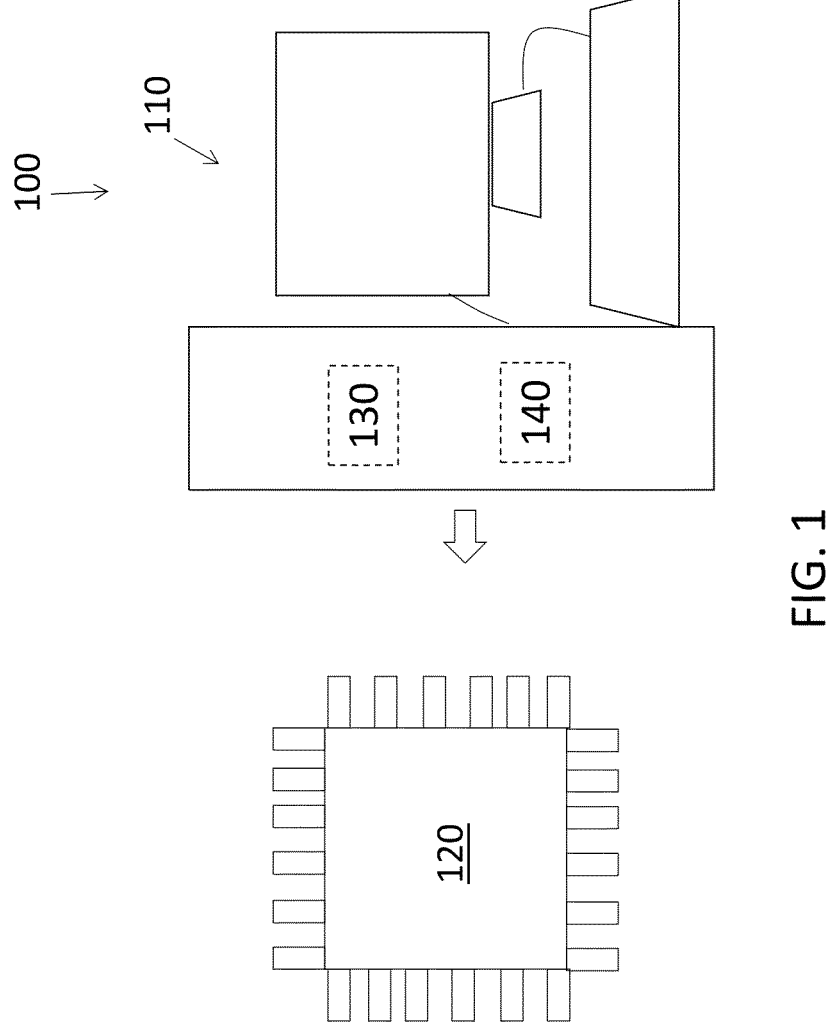
FIG. 1 is a block diagram of a system to perform the development of an integrated circuit using thermally coupled aware device placement according to one or more embodiments of the invention.

FIG. 1 is a block diagram of a system 100 to perform exerciser device placement in the development of an integrated circuit according to embodiments of the invention. The system 100 includes processing circuitry 110 used to generate the design that is ultimately fabricated into an integrated circuit 120. The steps involved in the fabrication of the integrated circuit 120 are well-known and briefly described herein. Once the physical layout is finalized, design data is provided to a foundry where masks are generated for each layer of the integrated circuit based on the finalized physical layout. Then, the wafer is processed in the sequence of the mask order. The processing includes photolithography and etch. This is further discussed with reference to FIG. 16.

Figure 2:
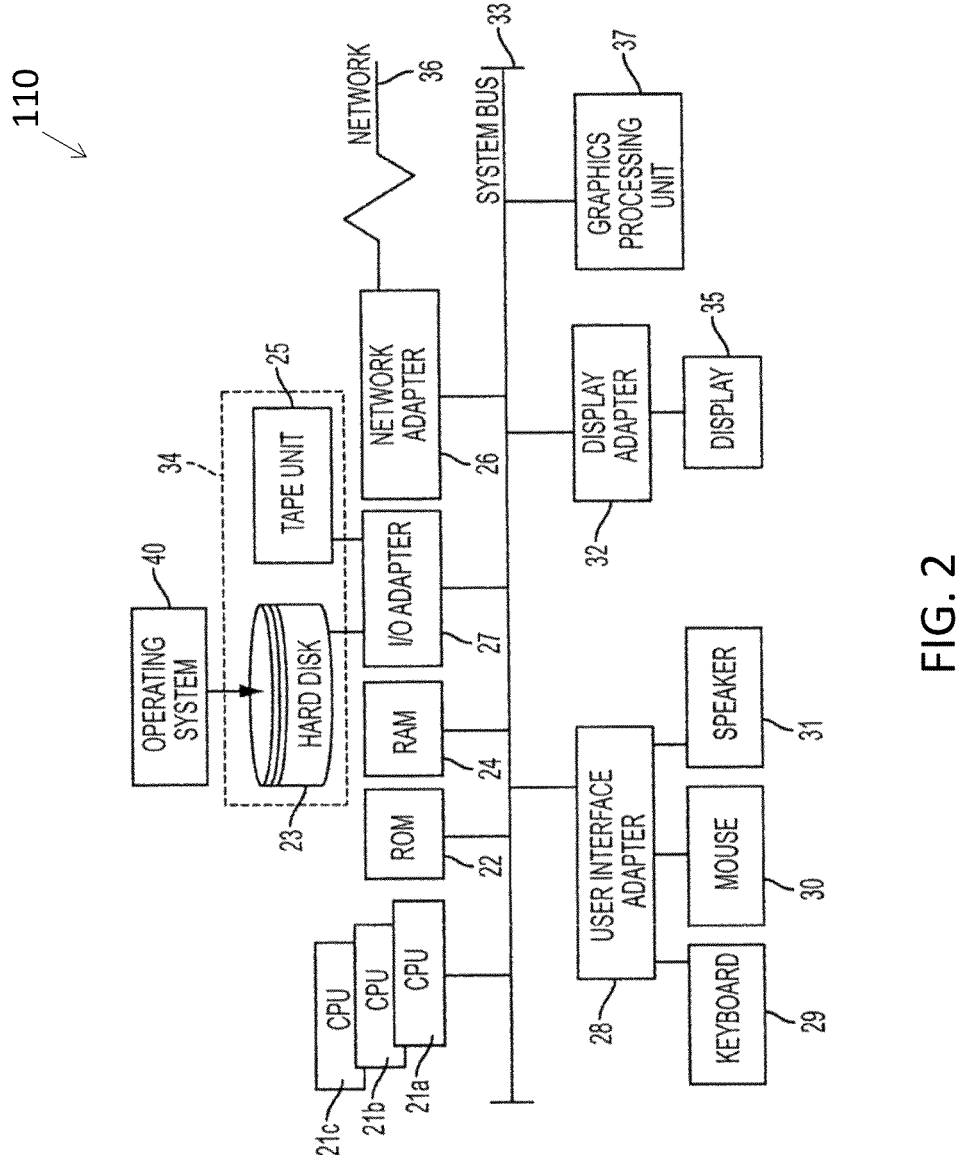
FIG. 2 is a block diagram of a processing system to generate the design that is fabricated into the integrated circuit according to one or more embodiments of the invention.

FIG. 2 is a block diagram of a processing system 110 used to generate the design that is fabricated into the integrated circuit 120. The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in the processing system 110.

Figure 3A:
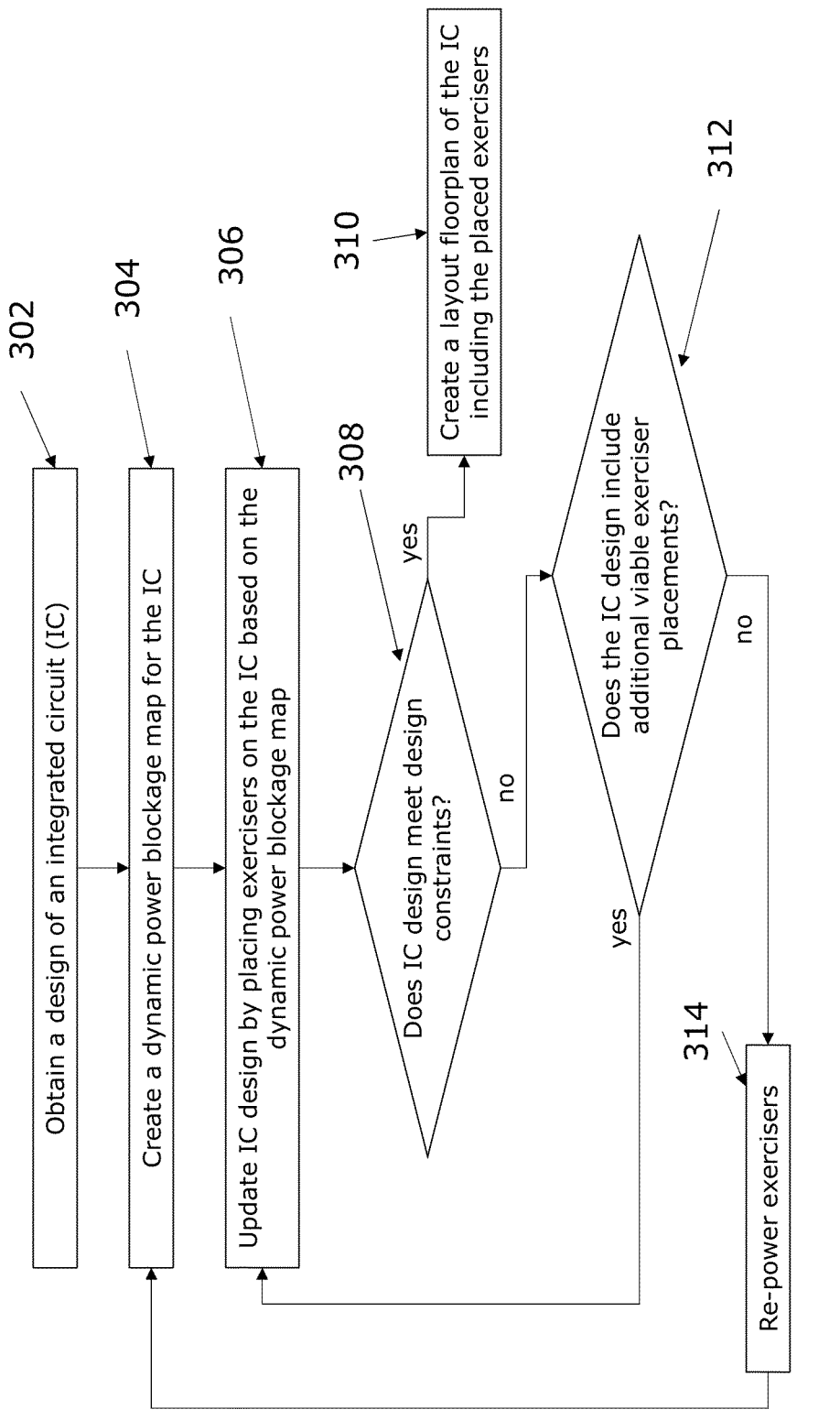
FIG. 3A is a process flow of a method of exerciser device placement in the development of an integrated circuit according to one or more embodiments of the invention.

Referring now to FIG. 3A, a process flow of a method 300 for exerciser device placement in the development of an integrated circuit according to one or more embodiments of the invention is shown. The method 300 begins at block 302 by obtaining a design of an integrated circuit (IC). In exemplary embodiments, the design includes a plurality of devices disposed on a chip. Next, as shown at block 304 the method 300 includes creating a dynamic power blockage map for the IC. In exemplary embodiments, the dynamic power blockage map is configured to identify potential placement locations for exercisers on the IC. In exemplary embodiments, the dynamic power blockage map is created based on one or more of electromigration design constraints, power density and resource based constraints, and custom constraints provided by a chip designer. The process for creating a dynamic power blockage map is discussed in more detail herein with reference to FIG. 3B.

Next, as shown at block 306, the method 300 includes updating the IC design by placing one or more exercisers on the IC based on the dynamic power blockage map. After one or more exercisers have been placed on the IC, the method 300 proceed to decision block 308 and it is determined if the IC meets the specified design constraints. In exemplary embodiments, the design constraints include a maximum operating voltage (Vmax) of the IC, a proximity of the exercisers to other components on the IC, an availably of metal resources in the area of the exercisers, and the like. Based on a determination that the IC meets the design constraints, the method 300 proceed to block 310 and creates a layout floor plan of the IC including the placed exercisers.

Based on a determination that the IC does not meet at least one of the design constraints, the method 300 proceeds to decision block 312 and determines whether the IC design includes additional viable exerciser placements. Based on a determination that the IC design includes additional viable exerciser placements, the method 300 returns to block 306 and updates the IC design by placing additional exercisers on the IC based on the dynamic power blockage map. Based on a determination that the IC design does not include additional viable exerciser placements, the method 300 proceeds to block 314 and re-powers the exercisers. As used herein, re-powering the exercisers includes changing a power level, i.e., current draw, of the exercisers that are being evaluated for placement on the IC. Next, the method 300 returns to block 304 and creates a new dynamic power blockage map based on the re-powered exercisers.

Figure 3B:
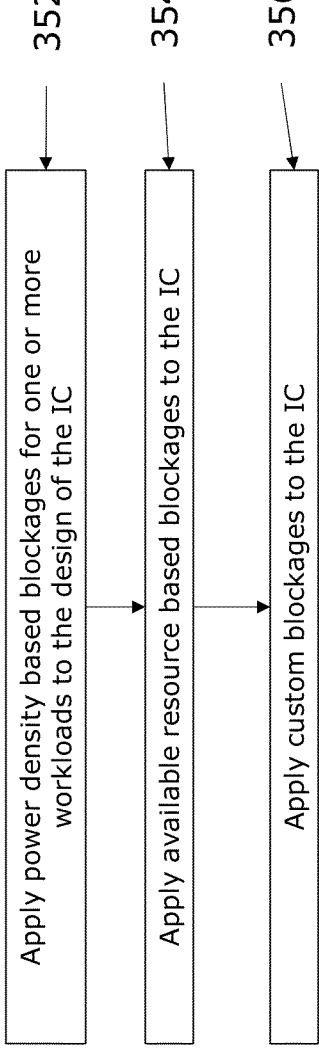
FIG. 3B is a process flow of a method of creating a dynamic power blockage map for an integrated circuit according to one or more embodiments of the invention.

Referring now to FIG. 3B, a process flow of a method 350 of creating a dynamic power blockage map for an integrated circuit according to one or more embodiments of the invention is shown. The method 350 includes applying power density-based blockages for one or more workloads to the design of the IC, as shown at block 352. In exemplary embodiments, applying power density-based blockages for a workload includes simulating the operation of the IC during an expected operation condition of the IC, such as during an idle-condition, during a high power workload state, and the like. In exemplary embodiments, the one or more workloads are obtained based on expected operating states of the IC. Next, as shown at block 354, the method 350 includes apply available resource-based blockages to the IC. In exemplary embodiments, resource-based blockages are blockages that are created based on a determination that the blocked are of the IC does not have sufficient resources to support the operation of the exerciser. These resources may include, but are not limited to, metal resources. The method 350 also includes applying custom blockages to the IC. In exemplary embodiments, the custom blockages are provided by a designer of the IC and can include exerciser density constraints.

In exemplary embodiments, the dynamic power blockage map for an integrated circuit created based on combination of these blockages is used to identify potential locations for the exerciser placement on the IC, such that none of the exercisers overlap with regions of the IC that exhibit a high-power density prior to the introduction of any exerciser mechanism. In exemplary embodiments, one or more the power density-based blockages and the resource-based blockages are determined based at least in part on a power level of the exercisers that are being considered for placement. For example, a resource-based blockage for an exerciser that will draw less current will smaller than a resource-based blockage for an exerciser that will draw more current.

Figure 4:
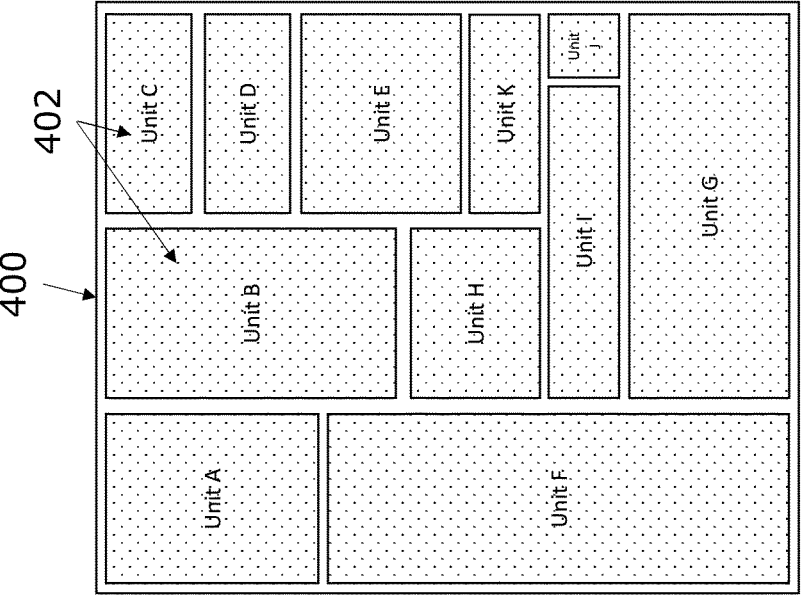
FIG. 4 illustrates a schematic diagram of an initial design of an integrated circuit according to one or more embodiments of the invention.

Referring now to FIG. 4, a schematic diagram of an initial design of an integrated circuit (IC) 400 according to one or more embodiments is shown. As shown, the IC 400 includes a plurality of components 402 disposed on the IC 400. As will be appreciated by those of ordinary skill in the art, the initial design of the IC 400 is a simplified illustration of a design of an integrated circuit and is not intended to be limiting in any way.

Figure 5:
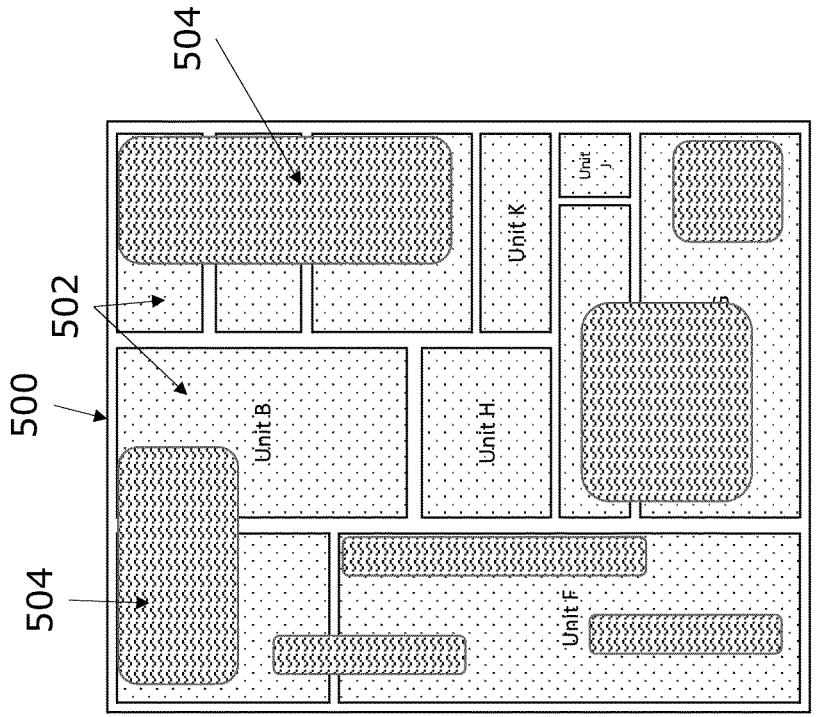
FIG. 5 illustrates a schematic diagram of a design of an integrated circuit having a power blockage map for a first workload according to one or more embodiments of the invention.

FIG. 5 illustrates a schematic diagram of a design of an integrated circuit (IC) 500 having a power blockage map for a first workload according to one or more embodiments. As shown, the IC 500 includes a plurality of components 502 disposed on the IC 500 and a plurality of blockage areas 504. In exemplary embodiments, the plurality of blockage areas 504 are created by simulating the operation of the IC 500 for a first workload that corresponds to one expected usage state of the IC 500. In exemplary embodiments, the simulation of the operation of the IC 500 is further based on a specified size of exercisers that are being considered for placement on the IC 500. As used herein, the size of an exerciser refers to a power consumption of the exerciser.

Figure 6:
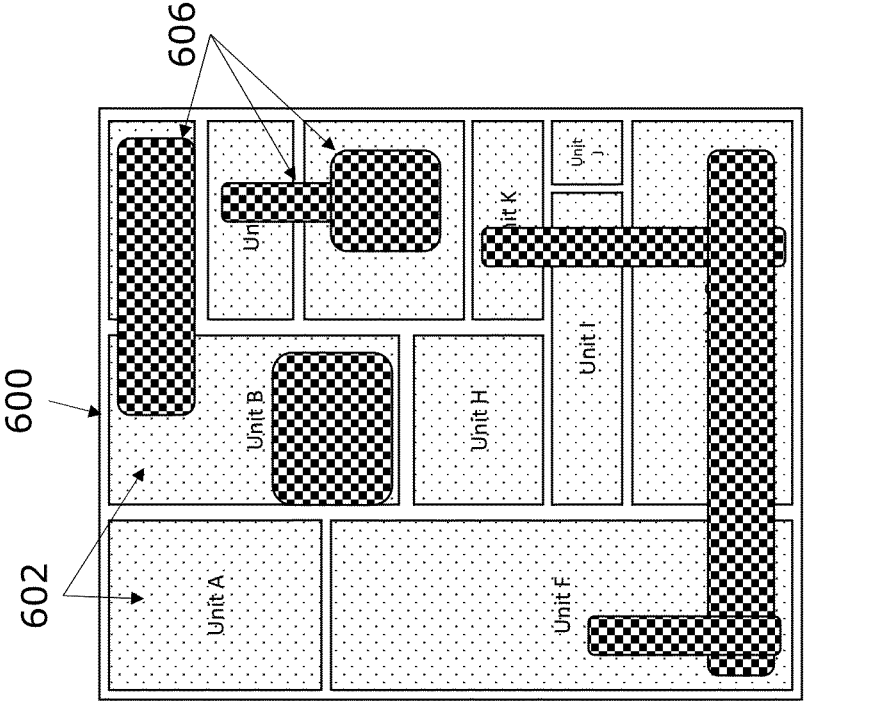
FIG. 6 illustrates a schematic diagram of a design of an integrated circuit having a power blockage map for a second workload according to one or more embodiments of the invention.

FIG. 6 illustrates a schematic diagram of a design of an integrated circuit (IC) 600 having a power blockage map for a second workload according to one or more embodiments. As shown, the IC 600 includes a plurality of components 602 disposed on the IC 600 and a second plurality of blockage areas 606. In exemplary embodiments, the second plurality of blockage areas 606 are created by simulating the operation of the IC 600 for a second workload that corresponds to a second expected usage state of the IC 600. In exemplary embodiments, the simulation of the operation of the IC 600 is further based on a specified size of exercisers that are being considered for placement on the IC 600.

Figure 7:
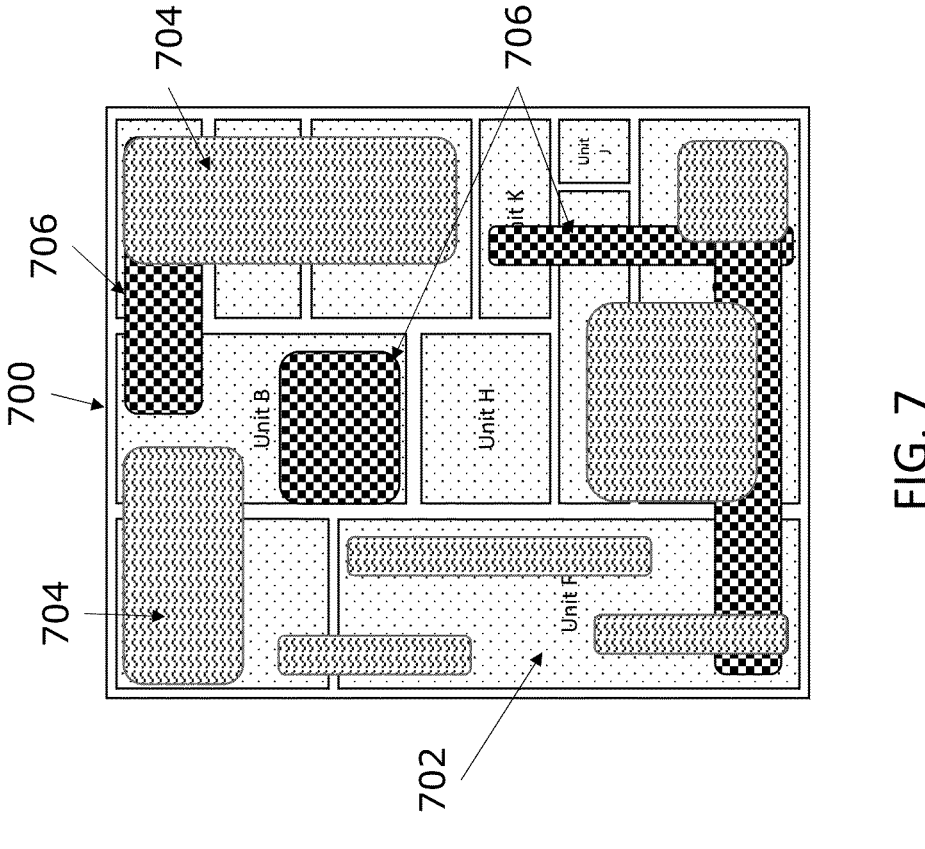
FIG. 7 illustrates a schematic diagram of a design of an integrated circuit having a power blockage map for both a first workload and second workload according to one or more embodiments of the invention.

FIG. 7 illustrates a schematic diagram of a design of an integrated circuit (IC) 700 having a power blockage map for both a first workload and second workload according to one or more embodiments. As shown, the IC 700 includes a plurality of components 702 disposed on the IC 700, a first plurality of blockage areas 704, and a second plurality of blockage areas 706. In exemplary embodiments, the first plurality of blockage areas 704 are created by simulating the operation of the IC 700 for a first workload that corresponds to one expected usage state of the IC 700. In exemplary embodiments, the second plurality of blockage areas 706 are created by simulating the operation of the IC 700 for a second workload that corresponds to a second expected usage state of the IC 700. In exemplary embodiments, multiple different workloads representing different expected usages of the IC are simulate to simulate typical IC usage.

Figure 8:
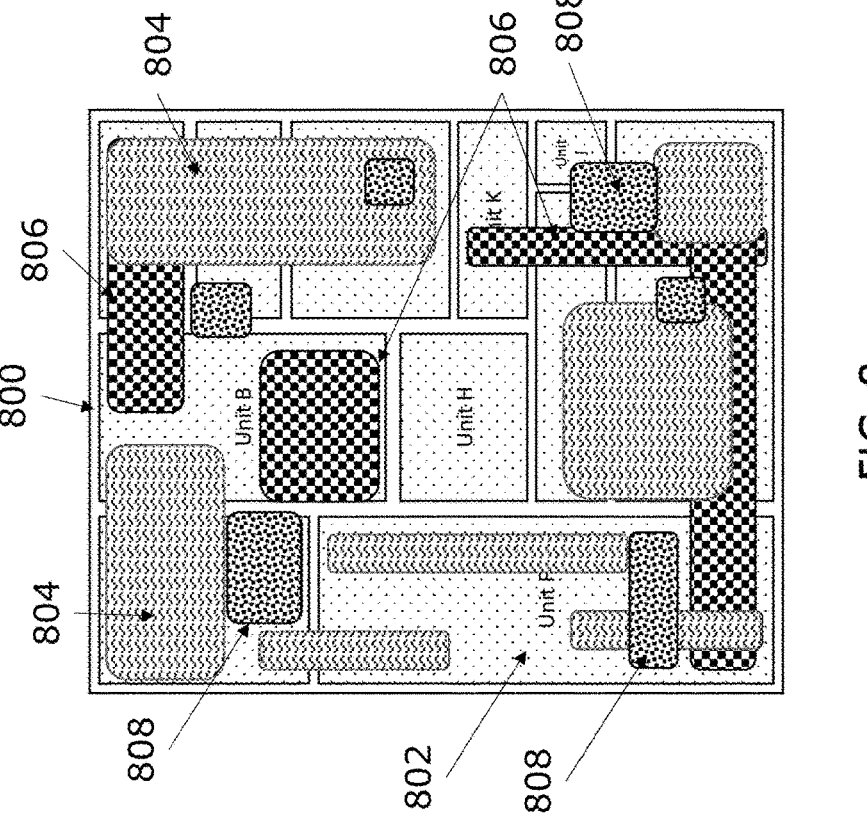
FIG. 8 illustrates a schematic diagram of a design of an integrated circuit having a power blockage map based on the first workload, the second workload, and resource based blockages according to one or more embodiments of the invention.

Referring now to FIG. 8 a schematic diagram of a design of an integrated circuit (IC) 800 having a power blockage map based on the first workload, the second workload, and resource-based blockages according to one or more embodiments is shown. As shown, the IC 800 includes a plurality of components 802 disposed on the IC 800, a first plurality of blockage areas 804, a second plurality of blockage areas 806, and a third plurality of blockage areas 808. The first plurality of blockage areas 804 are created by simulating the operation of the IC 800 for a first workload and the second plurality of blockage areas 806 are created by simulating the operation of the IC 800 for a second workload. The third plurality of blockage areas 808 are resource-based blockages that are created based on an analysis of the available resources on the IC and based on a specified size of exercisers that are being considered for placement on the IC 800.

Figure 9:
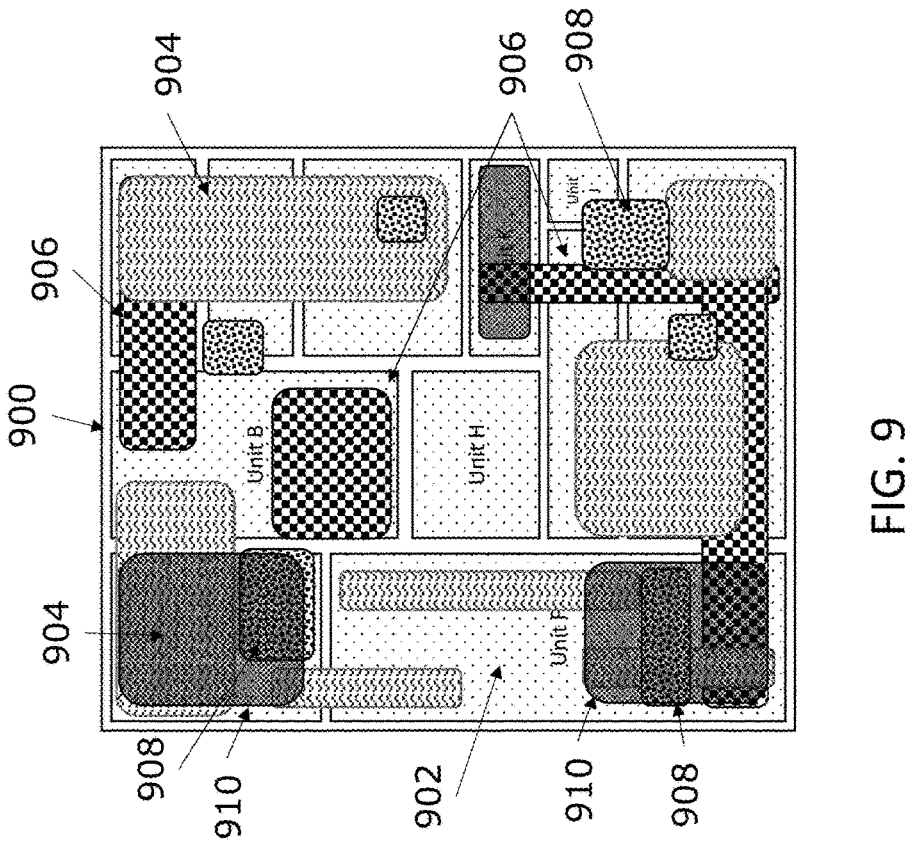
FIG. 9 illustrates a schematic diagram of a design of an integrated circuit having a power blockage map based on the first workload, the second workload, resource based blockages, and custom blockages according to one or more embodiments of the invention.

FIG. 9 illustrates a schematic diagram of a design of an integrated circuit (IC) 900 having a power blockage map based on the first workload, the second workload, resource-based blockages, and custom blockages according to one or more embodiments. As shown, the IC 900 includes a plurality of components 902 disposed on the IC 900, a first plurality of blockage areas 904, a second plurality of blockage areas 906, a third plurality of blockage areas 908, a fourth plurality of blockage areas 910. The first plurality of blockage areas 904 are created by simulating the operation of the IC 900 for a first workload and the second plurality of blockage areas 906 are created by simulating the operation of the IC 900 for a second workload. The third plurality of blockage areas 908 are resource-based blockages that are created based on an analysis of the available resources on the IC and based on a specified size of exercisers that are being considered for placement on the IC 900. The fourth plurality of blockage areas 910 are created based on custom blockages rules specified by a designer of the IC 900. In one embodiment, the custom blockages are set by a designer to ensure exercisers are not placed is specified areas of the IC 900. In one example, custom blockages are used to ensure that exercisers are not placed too closely to a C4 (Controlled Collapse Chip Connect) element on the IC 900 to prevent a C4 element from channeling excessive current to an exerciser.

Figures 10, 11:
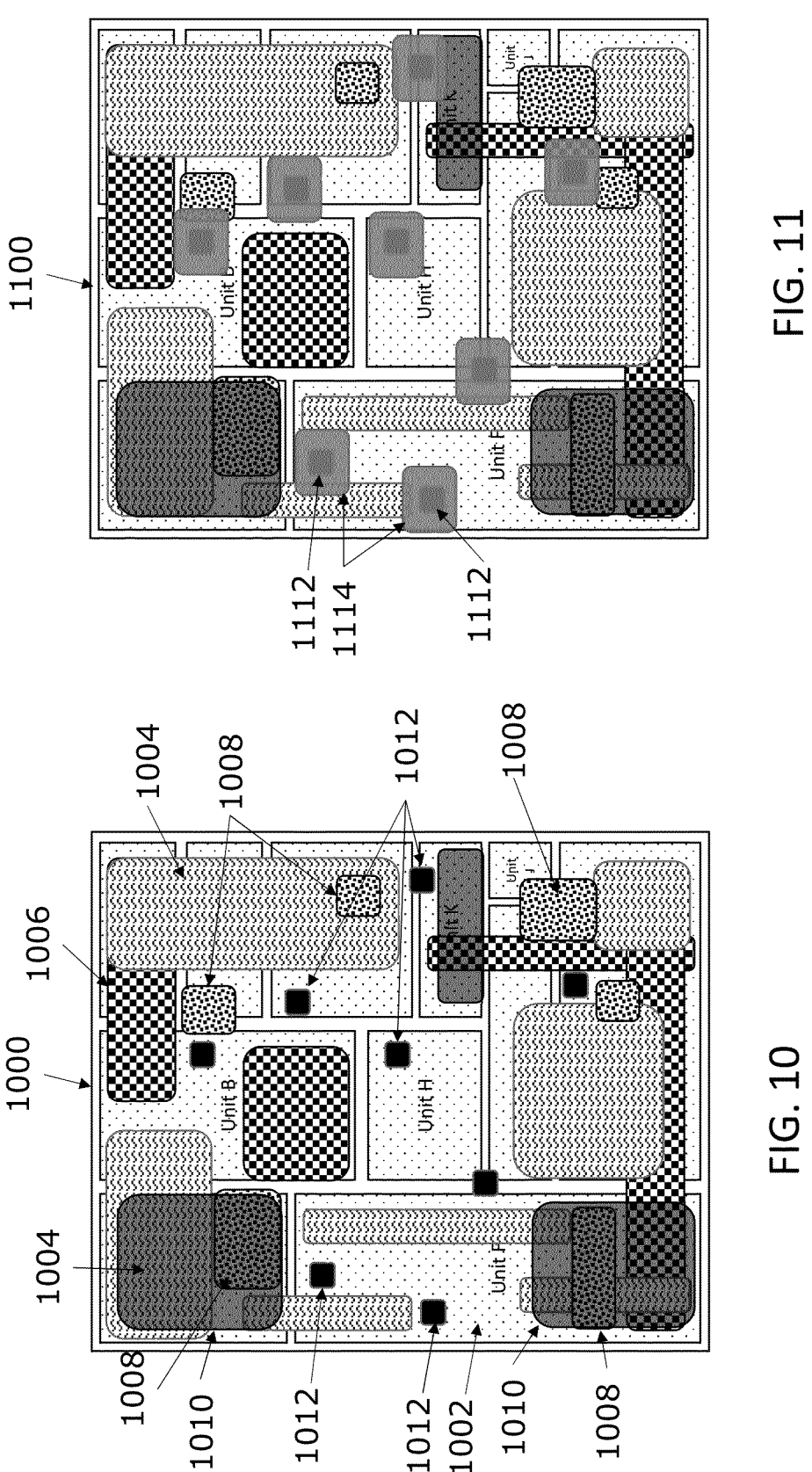
FIG. 10 illustrates a schematic diagram of a design of an integrated circuit having a power blockage map and potential exerciser placements according to one or more embodiments of the invention.
FIG. 11 illustrates a schematic diagram of a design of an integrated circuit having a power blockage map and potential exercise placements with associated blockages according to one or more embodiments of the invention.

Referring now to FIG. 10 a schematic diagram of a design of an integrated circuit (IC) 1000 having a power blockage map and potential exerciser placements according to one or more embodiments is shown. As shown, the IC 1000 includes a plurality of components 1002 disposed on the IC 1000, a first plurality of blockage areas 1004, a second plurality of blockage areas 1006, a third plurality of blockage areas 1008, a fourth plurality of blockage areas 1010, and potential exercisers 1012. The first plurality of blockage areas 1004 are created by simulating the operation of the IC 1000 for a first workload and the second plurality of blockage areas 1006 are created by simulating the operation of the IC 1000 for a second workload. The third plurality of blockage areas 1008 are resource-based blockages that are created based on an analysis of the available resources on the IC and based on a specified size of exercisers that are being considered for placement on the IC 1000. The fourth plurality of blockage areas 1010 are created based on custom blockages rules specified by a designer of the IC 1000.

In exemplary embodiments, the potential exercisers 1012 are placed in areas of the IC 1000 design that are not covered by blockage areas 1004, 1006, 1008, or 1010. In exemplary embodiments, a number of exercisers 1012 placed on the IC 1000 is less than a maximum number of exercisers specified by designer of the IC 1000. In one embodiment, each of the exercisers 1012 are controlled by a controller that is disposed on the IC 1000. In other embodiments, the controller for the exercisers 1012 is located on a separate IC. In exemplary embodiments, a weight map is created and used to determine the placement of the exercisers 1012 placed on the IC 1000. In one embodiment, the weight map calculates a score for each potential exercisers placement where the score is directly proportional to distance between the placement and the controller and the scores is inversely proportional to distance(s) between a potential exercisers placement and other exercisers. In exemplary embodiments, the potential exercisers placements with the lowest scores are selected to place the exercisers 1012. The weight map is configured to improve exerciser response to enables from the controller and to prevent clustering of exercisers and promote even distribution of the exercisers on the IC.

Referring now to FIG. 11 a schematic diagram of a design of an integrated circuit (IC) 1100 having a power blockage map and potential exercise placements with associated blockages according to one or more embodiments is shown. As illustrated, the IC 1100 includes a plurality of exercisers 1112 that are placed in location on the IC 1100 that are not covered by the power blockage map. Each of the plurality of exercisers 1112 includes a blockage area 1114 that includes the exerciser 1112 and a fixed area around each exerciser 1112. In exemplary emblements, the blockage area 1114 is configured to ensure a minimum separation between each of the plurality of exercisers 1112.

Figure 12:
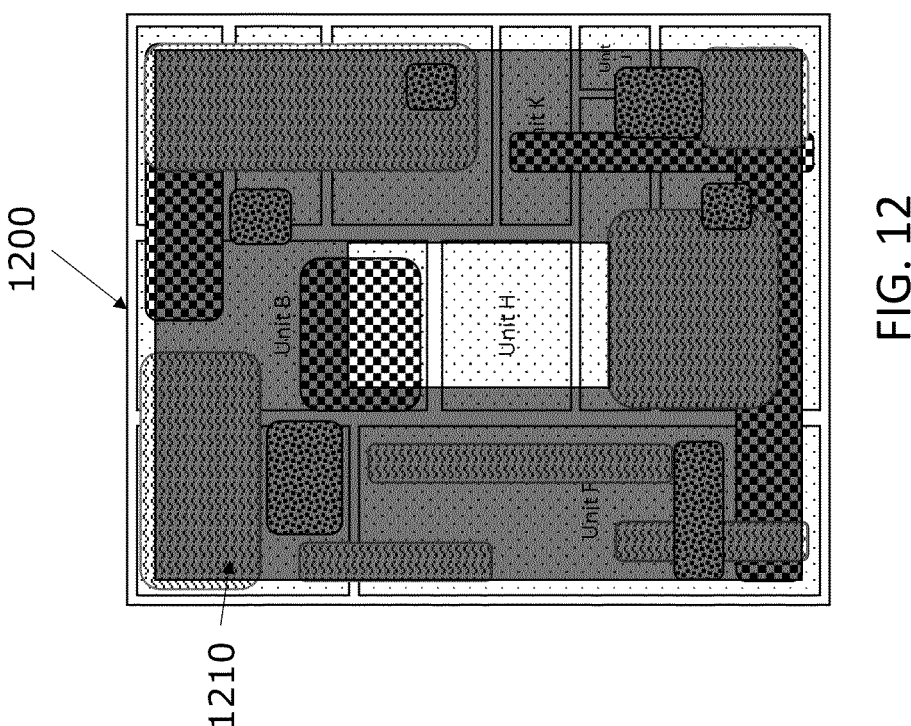
FIG. 12 illustrates a schematic diagram of a design of an integrated circuit having a power blockage map based having a custom blockage according to one or more embodiments of the invention.

Referring now to FIG. 12 a schematic diagram of a design of an integrated circuit (IC) 1200 having a power blockage map based having a custom blockage according to one or more embodiments is shown. As illustrated, the IC 1200 includes a custom blockage area 1210 the covers a substantial portion of the IC 1200, leaving only a specified central portion of the IC 1200 available for placement of exercisers.

Figure 13:
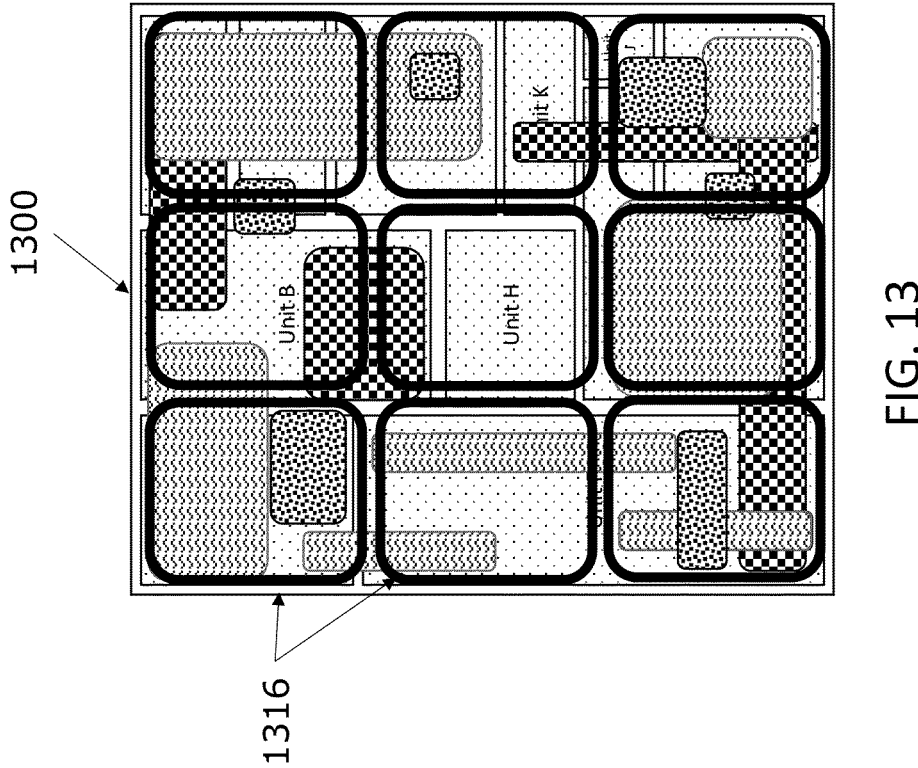
FIG. 13 illustrates a schematic diagram of a design of an integrated circuit having a power blockage map having exerciser placement regions according to one or more embodiments of the invention.

FIG. 13 illustrates a schematic diagram of a design of an integrated circuit (IC) 1300 having a power blockage map having exerciser placement regions according to one or more embodiments. As illustrated, the IC 1300 includes a plurality of regions 1316 that are used in determining the placements of the exercisers. In one embodiment, only a single exerciser is allowed to be placed in each region 1316. In one embodiment, the plurality of regions 1316 are uniform in size and are configured to ensure consistent power density across the IC 1300 and to prevent excessive spreading of associated circuits.

Figure 15:
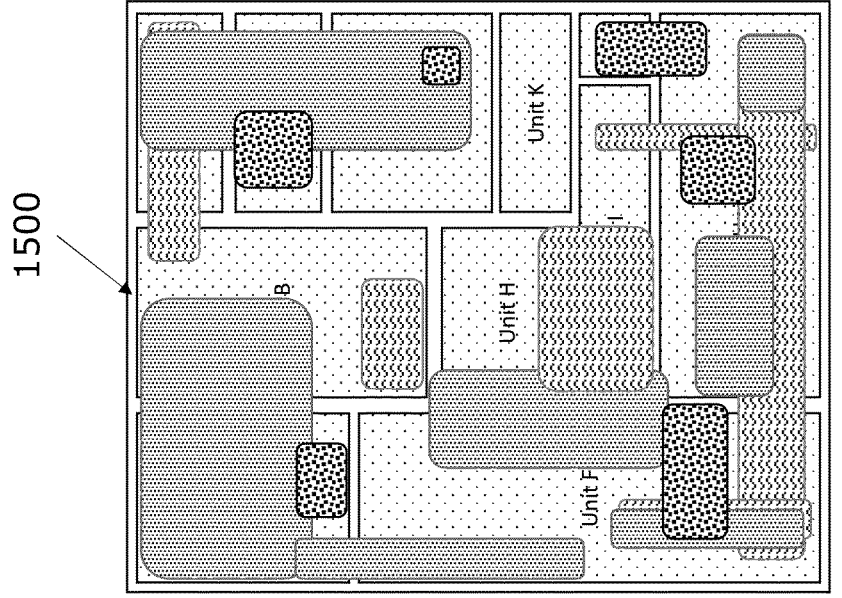
FIG. 15 illustrates a schematic diagram of a design of an integrated circuit having a power blockage map based on a second exerciser power-level according to one or more embodiments of the invention.
Figure 14:
FIG. 14 illustrates a schematic diagram of a design of an integrated circuit having a power blockage map based on a first exerciser power-level according to one or more embodiments of the invention.

As discussed above, the simulation of the operation of the IC to create workload-based power blockage is based on a specified size of exercisers that are being considered for placement on the IC. For example, the workload-based power blockages for a same workload will be different based on the power level of the size of exercisers that are being considered for placement on the IC. This difference in workload-based power blockages is shown in FIGS. 14 and 15 which respectively show power blockage maps for a single workload but created based on exercisers having different power-levels. FIG. 14 shows an IC 1400 having a power blockage map based on a first workload and a first exerciser power-level and FIG. 15 shows an IC 1500 having a power blockage map based on the first workload and a second exerciser power-level, where the second exerciser power-level is approximately half of the first exerciser power-level.

Figure 16:
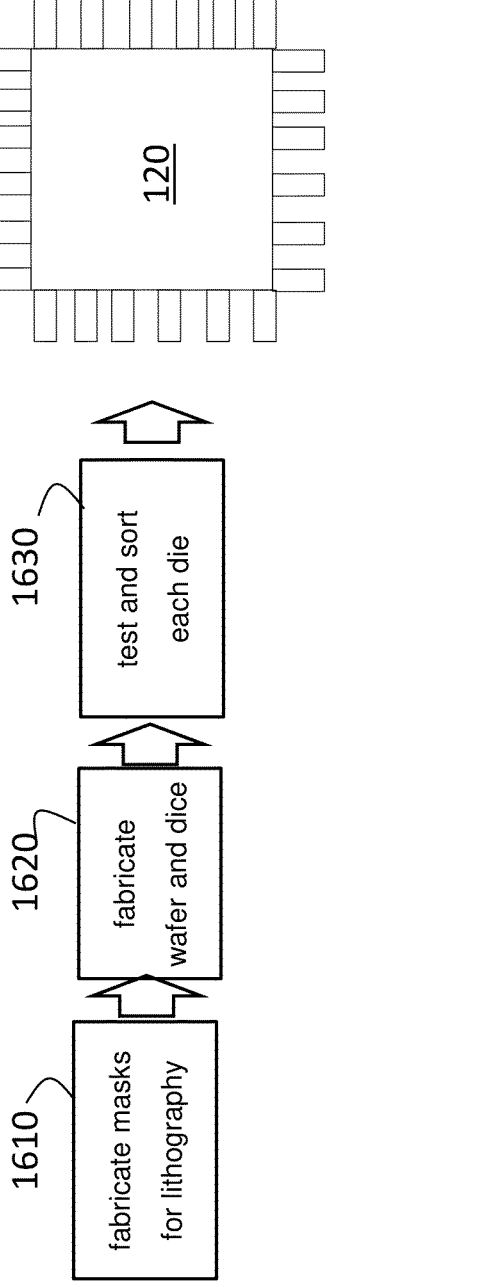
FIG. 16 is a process flow of a method of fabricating the integrated circuit according to exemplary embodiments of the invention.

FIG. 16 is a process flow of a method of fabricating the integrated circuit according to exemplary embodiments of the invention. Once the physical design data is obtained, based, in part, on the processes discussed with reference to FIGS. 3A and 3B, the integrated circuit 120 can be fabricated according to known processes that are generally described with reference to FIG. 16. Generally, a wafer with multiple copies of the final design is fabricated and cut (i.e., diced) such that each die is one copy of the integrated circuit 120. At block 1610, the processes include fabricating masks for lithography based on the finalized physical layout. At block 1620, fabricating the wafer includes using the masks to perform photolithography and etching. Once the wafer is diced, testing and sorting each die is performed, at block 1630, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for exerciser device placement in the development of an integrated circuit, the method comprising:
   obtaining a design of an integrated circuit;
   creating a dynamic power blockage map for the integrated circuit;
   updating the integrated circuit design by placing one or more exercisers on the integrated circuit, wherein a location of the one or more exercisers on the integrated circuit is based on at least in part on the dynamic power blockage map;
   based on a determination that the updated integrated circuit design complies with one or more design constraints, outputting the updated integrated circuit design; and
   creating an updated dynamic power blockage map for the integrated circuit based on an exerciser having a power consumption level that is less than a power consumption level of the one or more exercisers, based on a determination that the updated integrated circuit design does not comply with one or more design constraints and that the updated design of the integrated circuit does not include least one additional viable exercisers placement location.

2. The method of claim 1, wherein the dynamic power blockage map is created by applying one or more power density-based blockages for one or more workloads to the design of the integrated circuit and applying one or more resource-based blockages to the design of the integrated circuit.

3. The method of claim 2, wherein the dynamic power blockage map is created by further applying one or more custom blockages to the design of the integrated circuit.

4. The method of claim 1, wherein the dynamic power blockage map is created based on a power consumption level of the one or more exercisers.

5. The method of claim 1, wherein the with one or more design constraints compliance with a maximum operating voltage of the integrated circuit.

6. The method of claim 1, further comprising updating the integrated circuit design by placing an additional exerciser on the integrated circuit based on a determination that the updated integrated circuit design does not comply with one or more design constraints and that the updated design of the integrated circuit includes at least one additional viable exercisers placement location.

7. A system comprising:

a memory having computer readable instructions; and one or more processors for executing the computer readable instructions, the computer readable instructions controlling the one or more processors to perform operations comprising:

obtaining a design of an integrated circuit;

creating a dynamic power blockage map for the integrated circuit;

updating the integrated circuit design by placing one or more exercisers on the integrated circuit, wherein a location of the one or more exercisers on the integrated circuit is based on at least in part on the dynamic power blockage map;

based on a determination that the updated integrated circuit design complies with one or more design constraints, outputting the updated integrated circuit design; and creating an updated dynamic power blockage map for the integrated circuit based on an exerciser having a power consumption level that is less than a power consumption level of the one or more exercisers, based on a determination that the updated integrated circuit design does not comply with one or more design constraints and that the updated design of the integrated circuit does not include least one additional viable exercisers placement location.

8. The system of claim 7, wherein the dynamic power blockage map is created by applying one or more power density-based blockages for one or more workloads to the design of the integrated circuit and applying one or more resource-based blockages to the design of the integrated circuit.

9. The system of claim 8, wherein the dynamic power blockage map is created by further applying one or more custom blockages to the design of the integrated circuit.

10. The system of claim 7, wherein the dynamic power blockage map is created based on a power consumption level of the one or more exercisers.

11. The system of claim 7, wherein the with one or more design constraints compliance with a maximum operating voltage of the integrated circuit.

12. The system of claim 7, wherein the operations further comprise updating the integrated circuit design by placing an additional exerciser on the integrated circuit based on a determination that the updated integrated circuit design does not comply with one or more design constraints and that the updated design of the integrated circuit includes at least one additional viable exercisers placement location.

13. A computer program product comprising a computer readable storage medium having program instructions embodied therewith, the program instructions executable by a processor to cause the processor to perform operations comprising:

obtaining a design of an integrated circuit;

creating a dynamic power blockage map for the integrated circuit;

updating the integrated circuit design by placing one or more exercisers on the integrated circuit, wherein a location of the one or more exercisers on the integrated circuit is based on at least in part on the dynamic power blockage map;

based on a determination that the updated integrated circuit design complies with one or more design constraints, outputting the updated integrated circuit design; and creating an updated dynamic power blockage map for the integrated circuit based on an exerciser having a power consumption level that is less than a power consumption level of the one or more exercisers, based on a determination that the updated integrated circuit design does not comply with one or more design constraints and that the updated design of the integrated circuit does not include least one additional viable exercisers placement location.

14. The computer program product of claim 13, wherein the dynamic power blockage map is created by applying one or more power density-based blockages for one or more workloads to the design of the integrated circuit and applying one or more resource-based blockages to the design of the integrated circuit.

15. The computer program product of claim 14, wherein the dynamic power blockage map is created by further applying one or more custom blockages to the design of the integrated circuit.

16. The computer program product of claim 13, wherein the dynamic power blockage map is created based on a power consumption level of the one or more exercisers.

17. The computer program product of claim 13, wherein the with one or more design constraints compliance with a maximum operating voltage of the integrated circuit.

18. The computer program product of claim 13, wherein the operations further comprise updating the integrated circuit design by placing an additional exerciser on the integrated circuit based on a determination that the updated integrated circuit design does not comply with one or more design constraints and that the updated design of the integrated circuit includes at least one additional viable exercisers placement location.

* * * * *